United States Patent
Vise et al.

(10) Patent No.: US 11,674,476 B2
(45) Date of Patent: Jun. 13, 2023

(54) MULTIPLE CHAMBER ROTATING DETONATION COMBUSTOR

(71) Applicant: General Electric Company, Schenectady, NY (US)

(72) Inventors: Steven Clayton Vise, Loveland, OH (US); Joseph Zelina, Waynesville, OH (US); Arthur Wesley Johnson, Cincinnati, OH (US); Clayton Stuart Cooper, Loveland, OH (US); Sibtosh Pal, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 779 days.

(21) Appl. No.: 15/618,289

(22) Filed: Jun. 9, 2017

(65) Prior Publication Data

US 2018/0355822 A1    Dec. 13, 2018

(51) Int. Cl.
*F02K 7/06* (2006.01)
*F02C 5/12* (2006.01)
(Continued)

(52) U.S. Cl.
CPC .................. *F02K 7/06* (2013.01); *F02C 5/11* (2013.01); *F02C 5/12* (2013.01); *F02K 7/08* (2013.01);
(Continued)

(58) Field of Classification Search
CPC . F02K 7/06; F02K 7/067; F02K 7/075; F02C 5/11; F02C 5/02; F02C 5/10–12;
(Continued)

(56) References Cited

U.S. PATENT DOCUMENTS 2,635,420 A * 4/1953 Jonker ...................... F02K 3/11
                                                     60/226.1
2,750,733 A * 6/1956 Paris ........................ F02K 7/075
                                                     60/248

(Continued)

OTHER PUBLICATIONS

Rankin et al. "Overview of Performance, Application, and Analysis of Rotating Detonation Engine Technologies"; Journal of propulsion and power, 33 (1) (2017), pp. 131-143, published online Nov. 24, 2016 (Year: 2016).*

(Continued)

*Primary Examiner* — Ted Kim
(74) *Attorney, Agent, or Firm* — Venable LLP; Edward A. Kmett; Michele V. Frank

(57) ABSTRACT

The present disclosure is directed to a rotating detonation combustion system for a propulsion system including a plurality of combustors in adjacent arrangement along the circumferential direction. Each combustor defines a combustor centerline extended through each combustor, and each combustor comprises an outer wall defining a combustion chamber and a combustion inlet. Each combustion chamber is defined by an annular gap and a combustion chamber length together defining a volume of each combustion chamber. Each combustor defines a plurality of nozzle assemblies each disposed at the combustion inlet in adjacent arrangement around each combustor centerline. Each nozzle assembly defines a nozzle wall extended along a lengthwise direction, a nozzle inlet, a nozzle outlet, and a throat therebetween, and each nozzle assembly defines a converging-diverging nozzle. A first array of combustors defines a first volume and a second array of combustors defines a second volume different from the first volume.

15 Claims, 6 Drawing Sheets

(51) Int. Cl.
*F02K 7/08* (2006.01)
*F02C 5/11* (2006.01)
*F23R 7/00* (2006.01)
*F02K 7/10* (2006.01)

(52) U.S. Cl.
CPC ............... *F23R 7/00* (2013.01); *F02K 7/10* (2013.01); *F05D 2220/80* (2013.01)

(58) Field of Classification Search
CPC ........ F05D 2220/80; F23R 7/00; F23R 3/286; F23R 3/42
See application file for complete search history.

(56) References Cited

U.S. PATENT DOCUMENTS

| | | | |
|---|---|---|---|
| 2,942,412 A | 6/1960 | Bollay | |
| 3,879,937 A | 4/1975 | Jenny | |
| 4,845,952 A * | 7/1989 | Beebe | F23R 3/34 60/737 |
| 4,916,896 A * | 4/1990 | Paul | F02K 3/11 60/244 |
| 5,345,758 A | 9/1994 | Bussing | |
| 5,901,550 A | 5/1999 | Bussing et al. | |
| 6,460,342 B1 * | 10/2002 | Nalim | F23R 3/56 60/39.45 |
| 6,526,936 B2 | 3/2003 | Nalim | |
| 6,813,878 B2 | 11/2004 | Kraft | |
| 6,907,724 B2 * | 6/2005 | Edelman | F02K 7/16 60/225 |
| 7,621,118 B2 | 11/2009 | Snyder et al. | |
| 7,784,267 B2 | 8/2010 | Tobita et al. | |
| 7,818,956 B2 | 10/2010 | Rasheed et al. | |
| 7,891,164 B2 | 2/2011 | Janssen et al. | |
| 8,091,336 B2 | 1/2012 | Edelman et al. | |
| 8,117,828 B2 | 2/2012 | Snyder et al. | |
| 8,341,932 B2 | 1/2013 | Wiedenhoefer et al. | |
| 8,893,467 B2 | 11/2014 | Nalim et al. | |
| 9,046,057 B2 | 6/2015 | Efremkin et al. | |
| 9,188,002 B2 | 11/2015 | Lee | |
| 9,512,805 B2 | 12/2016 | Snyder | |
| 9,556,794 B2 | 1/2017 | Falempin et al. | |
| 9,816,463 B2 * | 11/2017 | Falempin | F02K 7/10 |
| 2003/0131584 A1 * | 7/2003 | Butler | F02K 7/06 60/247 |
| 2006/0096295 A1 | 5/2006 | Kraft | |
| 2008/0006019 A1 * | 1/2008 | Tangirala | F23C 15/00 60/39.76 |
| 2012/0131901 A1 * | 5/2012 | Westervelt | F02C 9/266 60/204 |
| 2015/0167544 A1 * | 6/2015 | Joshi | F02B 53/04 123/205 |
| 2018/0080412 A1 * | 3/2018 | Mizener | F02C 5/02 |

OTHER PUBLICATIONS

Lin et al. "Experimental study on propagation mode of H2/Air continuously rotating detonation wave", international journal of hydrogen energy 4 0 (2015 ), pp. 1980-1993. (Year: 2015).*

Babbie etal "Effect of Elevated Mixture Pressure and Equivalence Ratio on Hydrogen-Air Detonation Cell Size" AIAA SciTech Forum, Jan. 4-8, 2016, San Diego, California, USA, 54th AIAA Aerospace Sciences Meeting, 10.2514/6.2016-0442 Jan. 2016, pp. 1-28. (Year: 2016).*

Lu etal "Rotating Detonation Wave Propulsion: Experimental Challenges, Modeling, and Engine Concepts" Journal of Propulsion and Power vol. 30, No. 5, September-Oct. 2014, pp. 1125-1142. (Year: 2014).*

Glassman etal "Combustion" book Fifth Edition, 2014, p. 291 (Year: 2014).*

U.S. Appl. No. 15/429,655, filed Feb. 10, 2017.

* cited by examiner

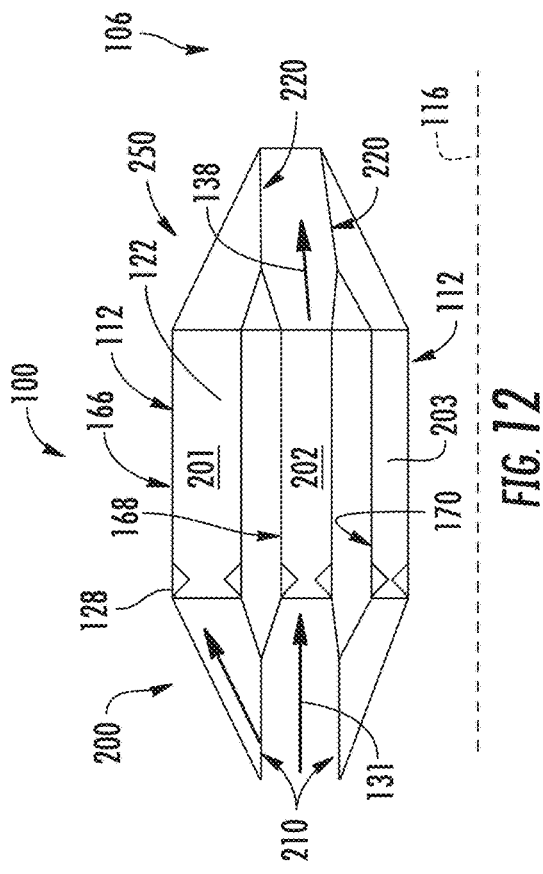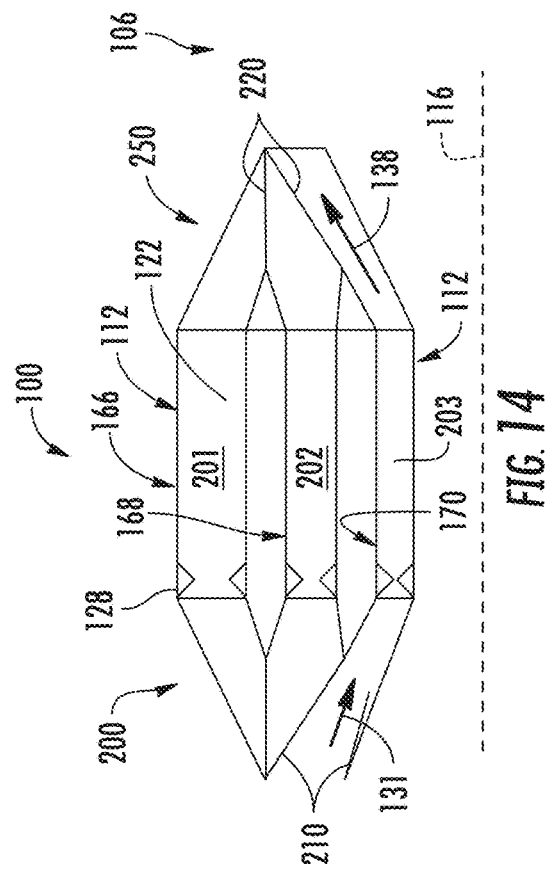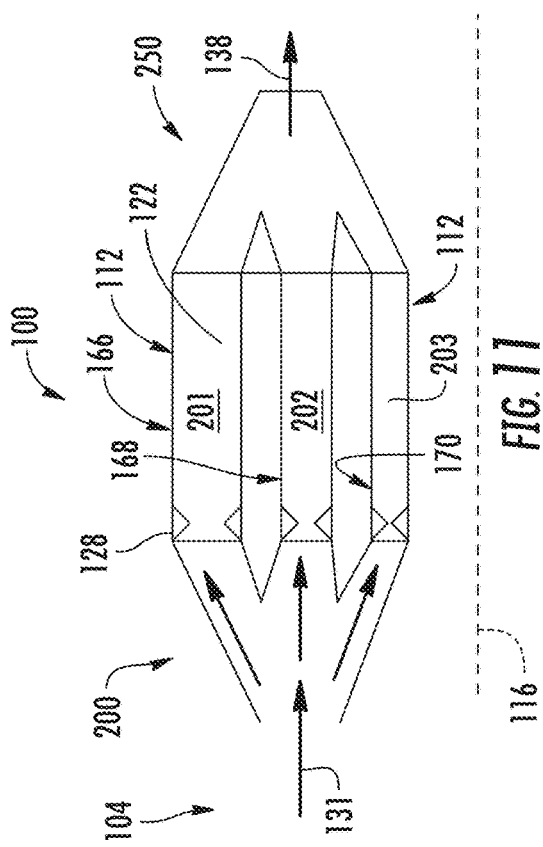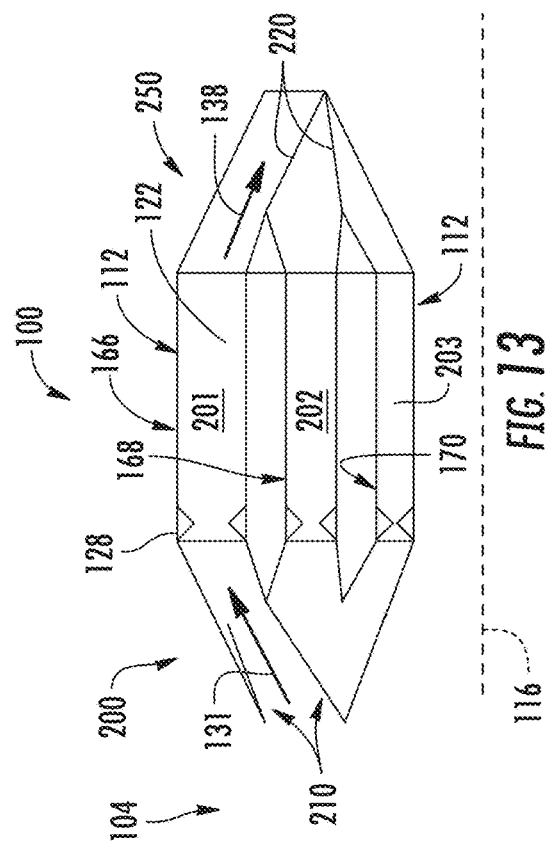

MULTIPLE CHAMBER ROTATING DETONATION COMBUSTOR

FIELD

The present subject matter relates generally to a system of continuous detonation in a propulsion system.

BACKGROUND

Many propulsion systems, such as gas turbine engines, are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such propulsion systems generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are welcomed nonetheless.

Accordingly, improvements in engine efficiency have been sought by modifying the engine architecture such that the combustion occurs as a detonation in either a continuous or pulsed mode. The pulsed mode design involves one or more detonation tubes, whereas the continuous mode is based on a geometry, typically an annulus, within which single or multiple detonation waves spin. For both types of modes, high energy ignition detonates a fuel/air mixture that transitions into a detonation wave (i.e., a fast moving shock wave closely coupled to the reaction zone). The detonation wave travels in a Mach number range greater than the speed of sound (e.g., Mach 4 to 8) with respect to the speed of sound of the reactants. The products of combustion follow the detonation wave at the speed of sound relative to the detonation wave and at significantly elevated pressure. Such combustion products may then exit through a nozzle to produce thrust or rotate a turbine.

However, propulsion systems, and rotating detonation combustion systems specifically, are generally designed or optimized to a specific operating condition or design point (e.g., an aero design point) at which the system is most efficient or operable. Outside or beyond such design points, a rotating detonation combustion system may be unacceptably inefficient or inoperable, such as the cell size for a fixed stoichiometry changing by approximately a factor of 20 across a range of pressures and temperatures (e.g., from a lowest operating condition to a highest operating condition), thereby limiting applications of rotating detonation combustion systems, or offsetting efficiencies of rotating detonation combustion systems at certain design points by excessive inefficiencies off design point.

Therefore, there is a need for a propulsion system and rotating detonation combustion system that provides efficiency and operability across a plurality of operating conditions.

BRIEF DESCRIPTION

Aspects and advantages of the invention will be set forth in part in the following description, or may be obvious from the description, or may be learned through practice of the invention.

The present disclosure is directed to a rotating detonation combustion system for a propulsion system. The rotating detonation combustion system defines a radial direction, a circumferential direction, and a longitudinal centerline in common with the propulsion system extended along a longitudinal direction. The rotating detonation combustion system includes a plurality of combustors in adjacent arrangement along the circumferential direction. Each combustor defines a combustor centerline extended through each combustor, and each combustor comprises an outer wall defining a combustion chamber and a combustion inlet. Each combustion chamber is defined by an annular gap and a combustion chamber length together defining a volume of each combustion chamber. Each combustor defines a plurality of nozzle assemblies each disposed at the combustion inlet in adjacent arrangement around each combustor centerline. Each nozzle assembly defines a nozzle wall extended along a lengthwise direction, a nozzle inlet, a nozzle outlet, and a throat therebetween, and each nozzle assembly defines a converging-diverging nozzle. A first array of combustors defines a first volume and a second array of combustors defines a second volume different from the first volume.

In various embodiments of the rotating detonation combustion system, the first array of combustors and the second array of combustors are each in alternating adjacent arrangement along the circumferential direction. In one embodiment, the plurality of combustors further defines a third array or more of combustors in alternating adjacent arrangement along the circumferential direction with the first array of combustors and the second array of combustors.

In still various embodiments, the first array of combustors and the second array of combustors are each in adjacent arrangement along the radial direction, and the first array of combustors are in adjacent arrangement along the circumferential direction at a first radius from the longitudinal centerline, and wherein the second array of combustors are in adjacent arrangement along the circumferential direction at a second radius from the longitudinal centerline. In one embodiment, the plurality of combustors further defines a third plurality or more of combustors in adjacent arrangement along the radial direction with the first array of combustors and the second array of combustors, in which each of the third or more pluralities of combustors are defined in circumferential arrangement at a third radius or more from the longitudinal centerline.

In one embodiment, the first array of combustors defines the first volume configured to produce a detonation cell width specific to a lowest steady state operating condition.

In another embodiment, the second array of combustors defines the second volume configured to produce a detonation cell width specific to a highest steady state operating condition.

In still another embodiment, the third array of combustors defines a third volume of the combustion chamber configured to produce a detonation cell width specific to an intermediate steady state or transient operating condition.

In various embodiments, the rotating detonation combustion system further includes a rotating detonation combustor inlet configured to direct a flow of an oxidizer to one or more of the plurality of arrays of combustors. In one embodiment, the rotating detonation combustor inlet comprises one or more articulating inlet walls configured to direct the flow of the oxidizer to an array of combustors.

In still various embodiments, the rotating detonation combustion system further includes a rotating detonation combustor outlet configured to direct a flow of combustion gases from the array of combustors to an exhaust section. In one embodiment, the rotating detonation combustor outlet comprises one or more articulating outlet walls configured to direct the flow of combustion gases from a single array of combustors to the exhaust section.

In another embodiment, each combustor includes a centerbody defining an inner wall of each combustion chamber, and a fuel injection port defining a fuel outlet located between the nozzle inlet and the nozzle outlet for providing fuel to the flow of oxidizer received through the nozzle inlet.

In yet another embodiment, the rotating detonation combustion system is configured to provide a fuel sequentially to the plurality of arrays of combustors.

The present disclosure is further directed to a propulsion system defining a radial direction, a longitudinal direction, and a circumferential direction, wherein a longitudinal centerline extends along the longitudinal direction, and an upstream end and a downstream end. The propulsion system includes an inlet section at the upstream end into which an oxidizer flows. The propulsion system further includes the rotating detonation combustion system downstream of the inlet section, and an exhaust section downstream of the rotating detonation combustion system.

In one embodiment of the propulsion system, the rotating detonation combustion system further defines a third array or more of combustors, in which the third array of combustors each define a third volume of the combustion chamber of each combustor, and the third array is configured to produce a detonation cell width specific to an intermediate steady state or transient operating condition.

In another embodiment of the propulsion system, the first array of combustors of the rotating detonation combustion system defines the first volume configured to produce a detonation cell width specific to a lowest steady state operating condition. In yet another embodiment, the second array of combustors defines the second volume configured to produce a detonation cell width specific to a highest steady state operating condition.

In still other embodiments of the propulsion system, the rotating detonation combustion system further includes a rotating detonation combustor inlet configured to direct a flow of an oxidizer from the inlet section to one or more of the plurality of arrays of combustors.

In still yet another embodiment of the propulsion system, the rotating detonation combustion system further includes a rotating detonation combustor outlet configured to direct a flow of combustion gases from the array of combustors to the exhaust section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 11 is an axial cross-sectional view of an exemplary embodiment of the rotating detonation combustion system shown in FIGS. 1-8;

FIG. 12 is an axial cross-sectional view of another exemplary embodiment of the rotating detonation combustion system shown in FIGS. 1-8;

FIG. 13 is an axial cross-sectional view of yet another exemplary embodiment of the rotating detonation combustion system shown in FIGS. 1-8; and FIG. 14 is an axial cross-sectional view of still another exemplary embodiment of the rotating detonation combustion system shown in FIGS. 1-8;

DETAILED DESCRIPTION

Figure 1:
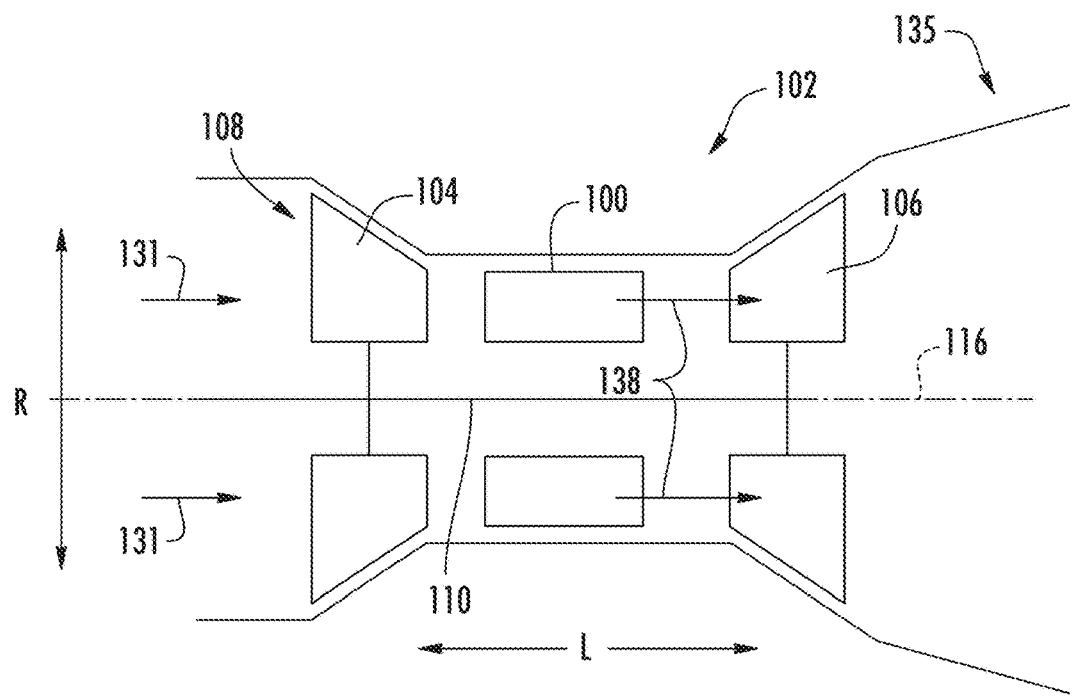
FIG. 1 is a schematic view of a propulsion system in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a propulsion system or vehicle, and refer to the normal operational attitude of the propulsion system or vehicle. For example, with regard to a propulsion system, forward refers to a position closer to a propulsion system inlet and aft refers to a position closer to a propulsion system nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Embodiments of a propulsion system and rotating detonation combustion (RDC) system that provide efficiency and operability across a plurality of operating conditions are generally provided. The embodiments generally provided herein enable a desired or optimum detonation cell width and/or cell quantity in one or more combustors of the rotating detonation combustion system across a plurality of operating conditions defining a plurality of pressures and temperatures at the RDC system. The embodiments generally provided herein include a plurality of combustors configured to provide a desired or optimum detonation cell width and/or quantity for a plurality of operating conditions of the RDC system and the propulsion system. As such, the RDC system and propulsion system may generally provide improved specific fuel consumption and fuel burn while also improving combustion stability, emissions, lean-blowout mitigation, and propulsion system operability.

Referring now to the figures, FIG. 1 depicts a propulsion system including a rotating detonation combustion system 100 (an "RDC system") in accordance with an exemplary embodiment of the present disclosure. For the embodiment of FIG. 1, the propulsion system 102 generally includes an inlet section 104 and an exhaust section 106, with the RDC system 100 located downstream of the inlet section 104 and upstream of the exhaust section 106. The propulsion system 102 defines a longitudinal direction L and a radial direction R. A longitudinal centerline 116 extends through the propulsion system 102 along the longitudinal direction L and is provided for illustrative purposes. In various embodiments, the propulsion system 102 defines a gas turbine engine, a ramjet, or other propulsion system including a fuel-oxidizer burner producing combustion products that provide propulsive thrust or mechanical energy output. In an embodiment of the propulsion system 102 defining a gas turbine engine, the inlet section 104 includes a compressor section defining one or more compressors generating a flow of oxidizer to the RDC system 100. The inlet section 104 may generally guide a flow of the oxidizer 131 to the RDC system 100. The inlet section 104 may further compress the oxidizer before it enters the RDC system 100. The inlet section 104 defining a compressor section may include one or more alternating stages of rotating compressor airfoils. In other embodiments, the inlet section 104 may generally define a decreasing cross sectional area from an upstream end to a downstream end proximate to the RDC system 100.

As will be discussed in further detail below, at least a portion of the flow of oxidizer is mixed with a fuel 163 (shown in FIG. 5) to generate combustion products 138. The combustion products 138 flow downstream to the exhaust section 106. In various embodiments, the exhaust section 106 may generally define an increasing cross sectional area from an upstream end proximate to the RDC system 100 to a downstream end of the propulsion system 102. Expansion of the combustion products 138 generally provides thrust that propels the apparatus to which the propulsion system 102 is attached, or provides mechanical energy to one or more turbines further coupled to a fan section, a generator, or both. Thus, the exhaust section 106 may further define a turbine section of a gas turbine engine including one or more alternating rows or stages of rotating turbine airfoils. The combustion products 138 may flow from the exhaust section 106 through, e.g., an exhaust nozzle 135 to generate thrust for the propulsion system 102.

As will be appreciated, in various embodiments of the propulsion system 102 defining a gas turbine engine, rotation of the turbine(s) within the exhaust section 106 generated by the combustion products is transferred through one or more shafts or spools 110 to drive the compressor(s) within the inlet section 104. In various embodiments, the inlet section 104 may further define a fan section, such as for a turbofan engine configuration, such as to propel air across a bypass flowpath outside of the RDC system 100 and exhaust section 106. The combustion products may then flow from the exhaust section 106 through, e.g., an exhaust nozzle 135 to generate thrust for the propulsion system 102.

It will be appreciated that the propulsion system 102 depicted schematically in FIG. 1 is provided by way of example only. In certain exemplary embodiments, the propulsion system 102 may include any suitable number of compressors within the inlet section 104, any suitable number of turbines within the exhaust section 106, and further may include any number of shafts or spools 110 appropriate for mechanically linking the compressor(s), turbine(s), and/or fans. Similarly, in other exemplary embodiments, the propulsion system 102 may include any suitable fan section, with a fan thereof being driven by the exhaust section 106 in any suitable manner. For example, in certain embodiments, the fan may be directly linked to a turbine within the exhaust section 106, or alternatively, may be driven by a turbine within the exhaust section 106 across a reduction gearbox. Additionally, the fan may be a variable pitch fan, a fixed pitch fan, a ducted fan (i.e., the propulsion system 102 may include an outer nacelle surrounding the fan section), an un-ducted fan, or may have any other suitable configuration.

Moreover, it should also be appreciated that the RDC system 100 may further be incorporated into any other suitable aeronautical propulsion system, such as a turboshaft engine, a turboprop engine, a turbojet engine, a ramjet engine, a scramjet engine, etc. Further, in certain embodiments, the RDC system 100 may be incorporated into a non-aeronautical propulsion system, such as a land-based or marine-based power generation system. Further still, in certain embodiments, the RDC system 100 may be incorporated into any other suitable propulsion system, such as a rocket or missile engine. With one or more of the latter embodiments, the propulsion system may not include a compressor in the inlet section 104 or a turbine in the exhaust section 106.

Figure 2:
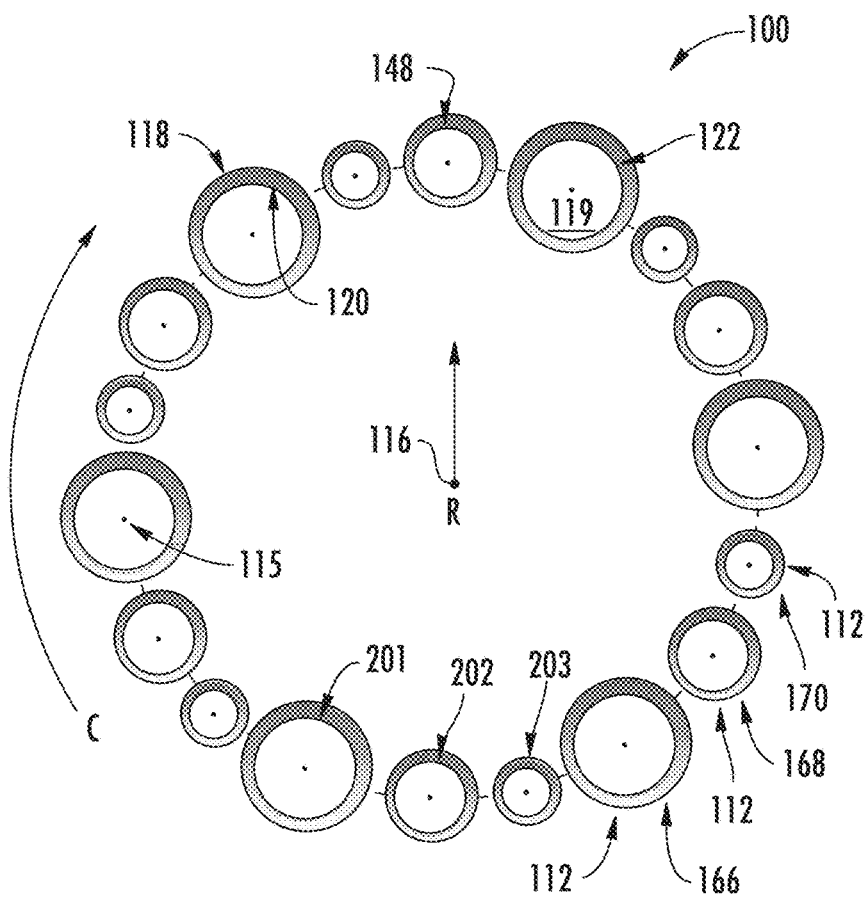
FIG. 2 is a cross-sectional circumferential view of a rotating detonation combustion system in accordance with an exemplary embodiment of the present disclosure.
Figure 3:
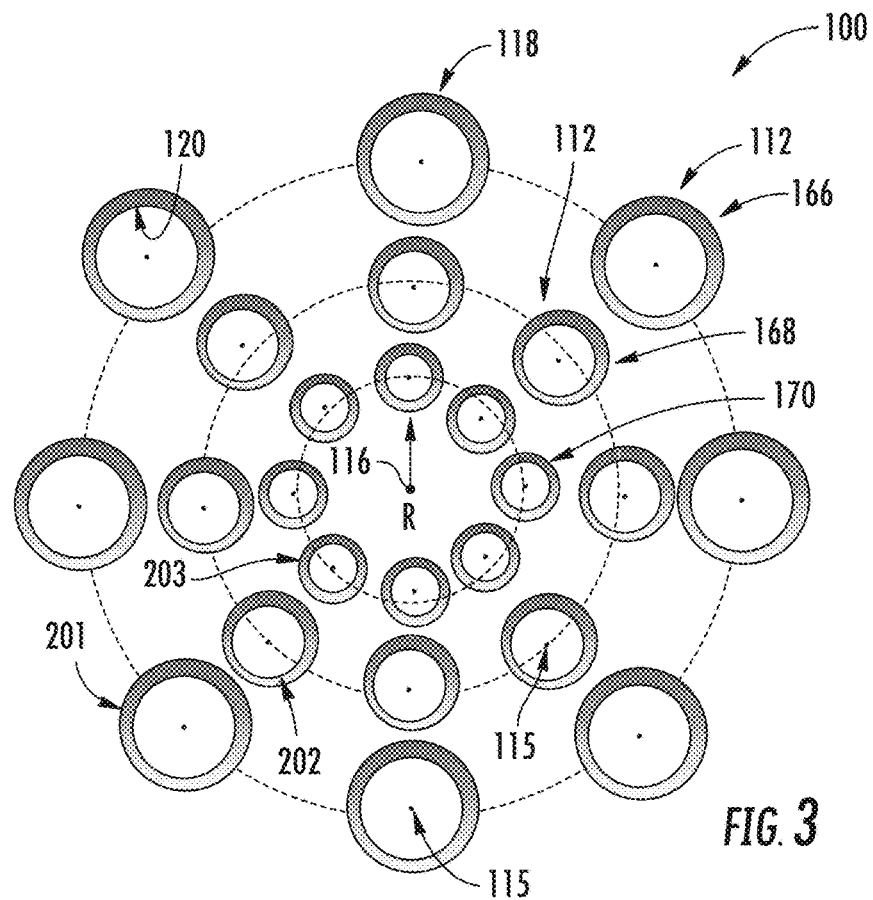
FIG. 3 is a cross-sectional circumferential view of a rotating detonation combustion system in accordance with another exemplary embodiment of the present disclosure.

Referring now to FIGS. 2-3, cross sectional views providing a circumferential view of exemplary embodiments of the RDC system 100 are generally provided. The RDC system 100 includes a plurality of combustors 112 disposed in adjacent arrangement along a circumferential direction C around the longitudinal centerline 116 of the propulsion system 102. Each combustor 112 defines a combustor centerline 115 in which each combustor centerline 115 disposes each combustor 112 in circumferential arrangement around the longitudinal centerline 116 of the propulsion system 102. Each combustor 112 includes an outer wall 118 defining a generally cylindrical walled enclosure. As a non-limiting example, the outer wall 118 defines each combustor 112 as a can combustor.

In one embodiment of the RDC system 100, such as generally provided in FIG. 2, the plurality of combustors 112 are disposed in adjacent circumferential arrangement generally at an approximately common radius from the longitudinal centerline 116. For example, each combustor centerline 115 of the plurality of combustors 112 is arranged at an approximately equal radius from the longitudinal centerline 116. The various embodiments of the plurality of combustors 112, as further described below as different arrays (e.g., first array 166, second array 168, third array 170, Nth array, etc.) are each alternating and disposed in adjacent circumferential arrangement from a first radius from the longitudinal centerline 116.

In another embodiment of the RDC system 100, such as generally provided in FIG. 3, the plurality of combustors 112 are each disposed in adjacent circumferential arrangement and furthermore in radial arrangement. For example, a first array 166 is disposed at a first radius from the longitudinal centerline 116; a second array 168 is disposed at a second radius from the longitudinal centerline 116 different from the first radius; and a third array 170 is disposed at a third radius from the longitudinal centerline 116 different from the first and second radii. In other embodiments, an Nth array may be disposed at an Nth radius from the longitudinal centerline 116 different from the other radii (e.g., first radius, second radius . . . Nth radius, etc.).

Figure 4:
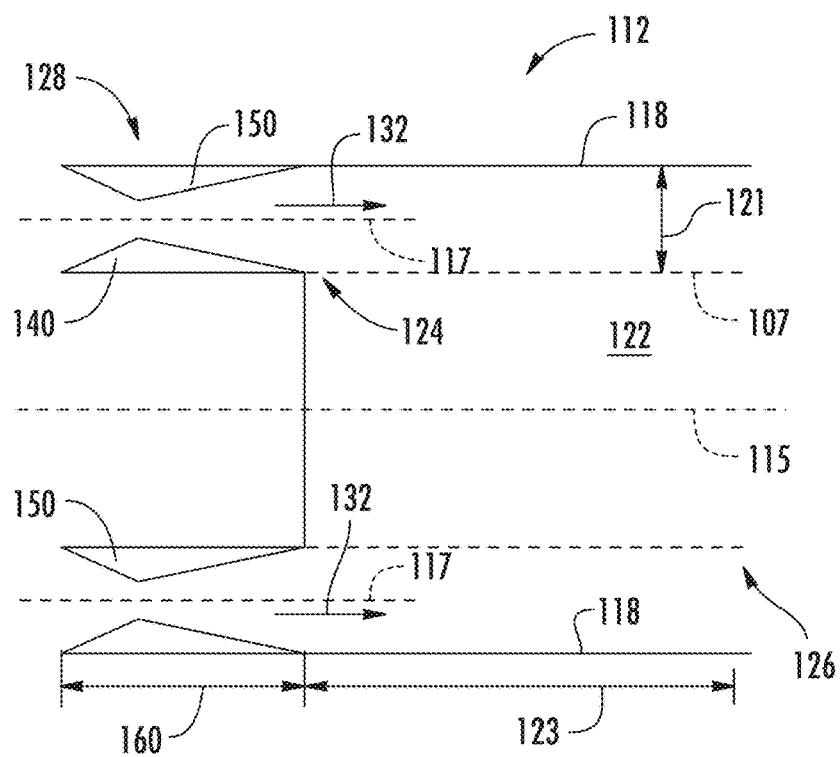
FIG. 4 is an axial view of the exemplary rotating detonation combustion system of FIGS. 1-3.

Referring to FIG. 4, within each walled enclosure defined by the outer wall 118 is defined a combustion chamber 122, a combustion chamber inlet 124 proximate to a nozzle assembly 128, and a combustion chamber outlet 126. The nozzle assembly 128 provides a flow mixture of oxidizer and fuel to the combustion chamber 122, wherein such mixture is combusted/detonated to generate the combustion products therein, and more specifically a detonation wave 130 as will be explained in greater detail below. The combustion products exit through the combustion chamber outlet 126. Each combustion chamber 122 defines a width or annular gap 121 and a combustion chamber length 123. The annular gap 121 and the combustion chamber length 123 together define a volume of each combustion chamber 122. The annular gap 121 and the combustion chamber length 123 are each variables at least partly determinate of a desired or optimal operating condition of the RDC system 100 and propulsion system 102. The annular gap 121 is defined as generally encompassing an area at which a mixture of fuel and oxidizer 195 (such as the fuel/oxidizer mixture 132 shown in FIG. 8) is present within the combustion chamber 122. In various embodiments, such as generally provided in FIGS. 2, 3, and 9, the annular gap 121 extends generally from the outer wall 118 to a generally cylindrical inner wall 120. In other embodiments, such as generally provided in FIGS. 4 and 10, the annular gap 121 is defined from the outer wall 118 to an inner diameter at which fuel is present in the combustion chamber 122, such as schematically shown by lines 107.

Referring now to FIGS. 2-4, the RDC system 100 defines a plurality of combustors 112 defining a plurality of volumes of combustion chambers 122. The RDC system 100 may generally define a first volume 201 corresponding to a first array 166 of combustors 112 and a second volume 202 corresponding to a second array 168 of combustors 112. In various embodiments, the RDC system 100 may further include a third volume 203 corresponding to a third array 170 of combustors 112, or a fourth, fifth, Nth, etc. volume corresponding to a fourth, first, Nth, etc. array of combustors 112. Each volume 201, 202, 203 is defined generally within the outer wall 118. For example, the outer wall 118 defines a diameter within which the combustion chamber 122 is defined, such as generally provided in FIG. 10. In various embodiments, such as generally provided in FIGS. 2, 3, and 9, the volume 201, 202, 203 of the combustion chamber 122 may further be defined between the outer wall 118 and the inner wall 120.

Each array defines each volume with an annular gap 121, a combustion chamber length 123, or both, different from each other array. Each volume (e.g., first volume 201, second volume 202, third volume 203, etc.) configures the annular gap 121, the combustion chamber length 123, or both to produce a desired or optimal quantity of detonation cells within each combustion chamber 122 based on the annular gap 121, the combustion chamber length 123, or both of each array 166, 168, 170 of combustors 112 and further based on a plurality of design points or operating conditions specific to each array 166, 168, 170.

For example, in one embodiment, the first array 166 of combustors 112 defines the first volume 201 (i.e., the annular gap 121, the combustion chamber length 123, or both) based on a desired quantity of detonation cells or cell size corresponding to pressure and temperatures conditions for a lowest steady state operating condition of the propulsion system 102 (e.g., lowest pressure, lowest temperature, or both at the RDC system 100 above initial light-off or startup). In an embodiment in which the propulsion system 102 defines a propulsive gas turbine engine, the lowest steady state operating condition may define a ground idle condition. In various embodiments, the first array 166 of combustors 112 may define the first volume 201 as a maximum volume relative to the plurality of combustors 112 defining a plurality of volumes.

As another example, in another embodiment, the third array 170 of combustors 112 defines the third volume 203 (i.e., the annular gap 121, the combustion chamber length 123, or both) based on a desired quantity of detonation cells or cell size corresponding to pressure and temperatures conditions for a highest steady state operating condition of the propulsion system 102 (e.g., highest pressure, highest temperature, or both at the RDC system 100). In an embodiment in which the propulsion system 102 defines a propulsive gas turbine engine, the highest steady state operating condition may define a maximum takeoff condition. In various embodiments, the third array 170 of combustors 112 may define the third volume 203 as a minimum volume relative to the plurality of combustors 112 defining a plurality of volumes.

As yet another example, in another embodiment, the second array 168 of combustors 112 defines the second volume 202 (i.e., the annular gap 121, the combustion chamber length 123, or both) based on a desired quantity of detonation cells or cell size corresponding to pressure and temperatures conditions for an intermediate steady state or transient operating condition of the propulsion system 102. In an embodiment in which the propulsion system 102 defines a propulsive gas turbine engine, the intermediate steady state or transient operating condition may define one or more conditions greater than ground idle and less than a maximum takeoff condition, such as, but not limited to, cruise, climb, flight idle, or approach. In various embodiments, the second array 170 of combustors 112 may define the second volume 202 greater than the first volume 201 and less than the third volume 203. In still another example, the second array 168 may be configured to an intermediate steady state operating condition corresponding to a cruise condition for an aero gas turbine engine. The intermediate steady state operating condition, such as a cruise condition, may be based further on one or more of a duration of time expected at the intermediate steady state operating condition, altitude, flow rate of oxidizer into the RDC system 100, pressure and/or temperature of the oxidizer and/or fuel, or combinations thereof.

Figure 5:
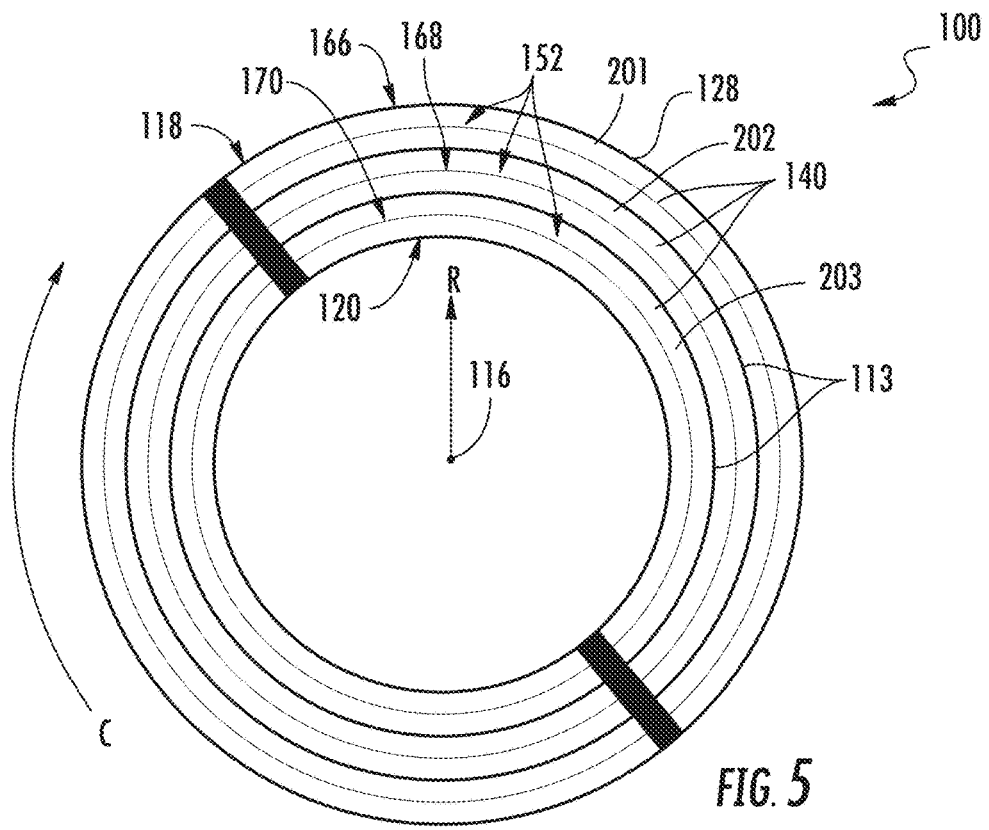
FIG. 5 is a cross-sectional circumferential view of a rotating detonation combustion system in accordance with yet another exemplary embodiment of the present disclosure.

Referring now to FIG. 5, a cross sectional view providing a circumferential view of another exemplary embodiment of the RDC system 100 is generally provided. The embodiment provided in FIG. 5 may be configured substantially similarly as shown and described in regard to FIGS. 1-4. However, in FIG. 5, each combustor 112 is disposed in adjacent radial arrangement from the longitudinal centerline 116. Each combustor 112 defines an array (e.g., array 166, 168, 170) disposed in generally concentric arrangement around the longitudinal centerline 116 (e.g., defining concentric annular combustor rings). As discussed in regard to FIGS. 2-4, each array defines a volume configured to a corresponding operating condition of the propulsion system 102.

Figure 6:
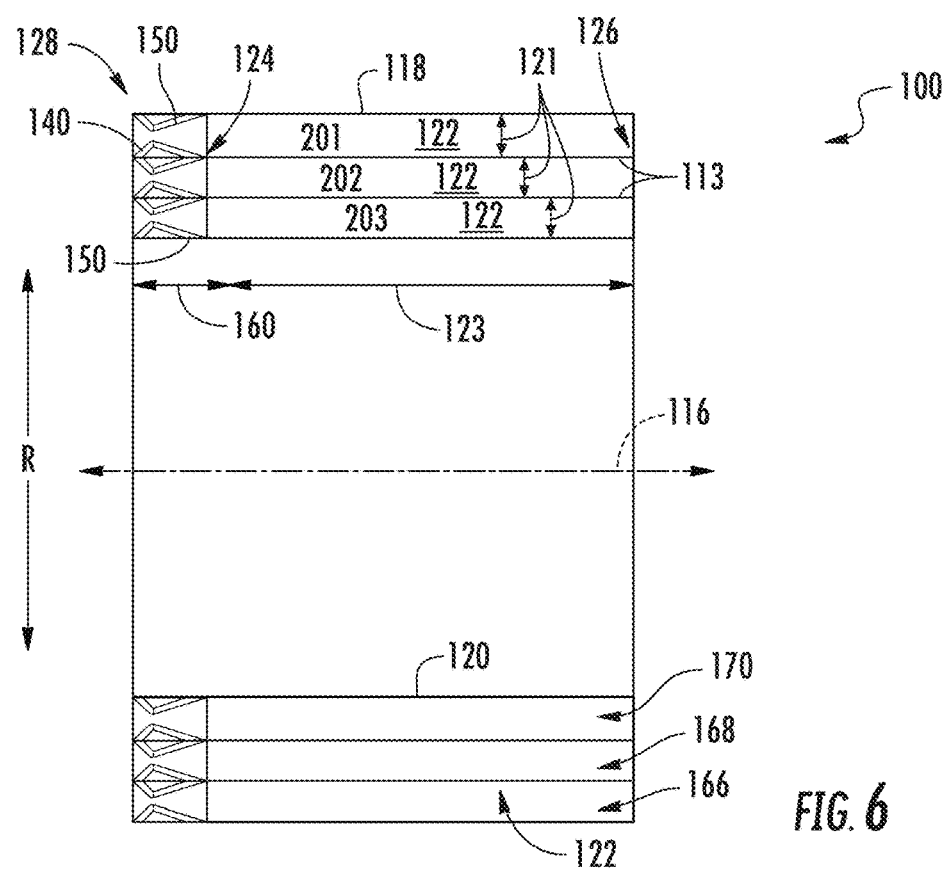
FIG. 6 is an axial view of the exemplary rotating detonation combustion system of FIG. 5.

Referring now to FIG. 6, a schematic cross sectional view is generally provided of the exemplary embodiment of the RDC system 100 shown in FIG. 5. Referring to FIGS. 5-6, each combustor 112 is defined by at least two of an outer wall 118, an intermediate wall 113, and an inner wall 120 extended along the longitudinal direction L from the nozzle assembly 128 and combustion inlet 124 to the combustion outlet 126. Each pair of walls 118, 113, 120 defines a combustion chamber 122 therebetween. For example, the outer wall 118 and one of the intermediate walls 113 defines the first array 166 defining the first volume 201 of the combustion chamber 122. A pair of intermediate walls 113 defines the second array 168 defining the second volume 202 of the combustion chamber 122. The inner wall 120 and one of the intermediate walls 113 defines the third array 170 defining the third volume 203. It should be appreciated that a plurality of pairs of intermediate walls 113 may further define additional arrays each defining additional volumes (e.g. fourth array, fifth array . . . Nth array). It should further be appreciated that the annular gap 121 is defined specific to each pair of the outer wall 118, the intermediate walls 113, and the inner wall 120 each defining a volume 201, 202, 203 of the combustion chamber 122.

Figure 7:
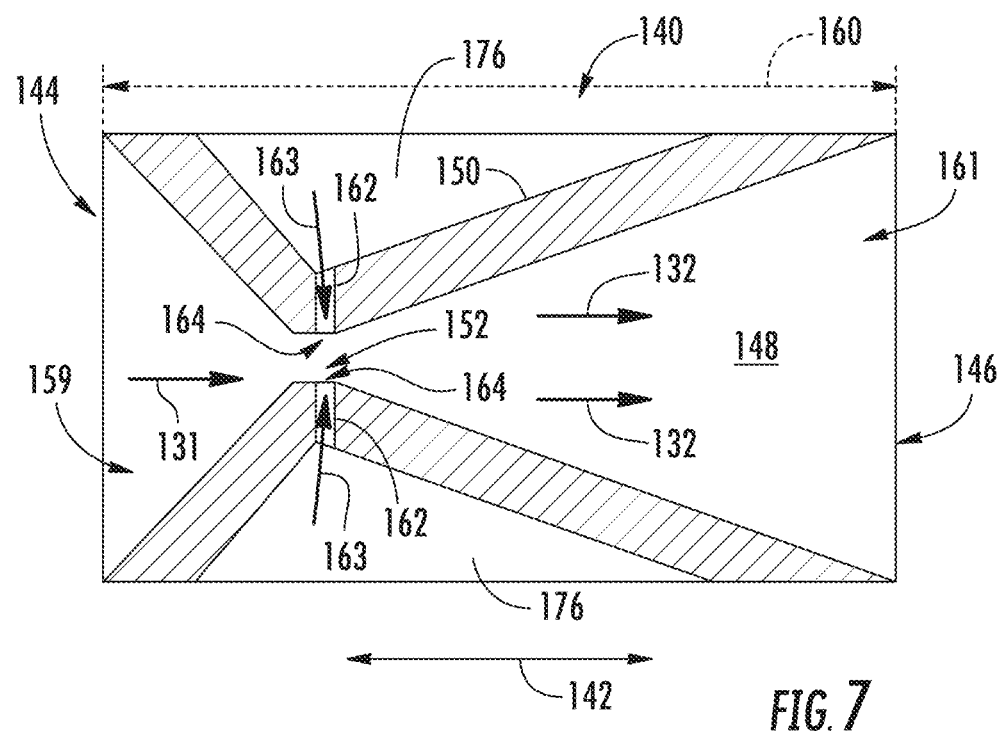
FIG. 7 is a close-up, axial cross-sectional view of a nozzle of the exemplary rotating detonation combustion system of FIGS. 1-3 in accordance with an exemplary embodiment of the present disclosure.

Referring now to FIG. 7, a schematic cross sectional view is provided of a portion of an exemplary nozzle assembly 128 of the RDC system 100 as may be incorporated into the exemplary embodiments of FIGS. 2-4. As shown, each nozzle 140 of the RDC system 100 generally defines a nozzle centerline 117 and a radial direction RR extended therefrom relative to the nozzle centerline 117. The nozzle 140 extends along the lengthwise direction 142 between a nozzle inlet 144 and a nozzle outlet 146, and further defines a nozzle flowpath 148 extending from the nozzle inlet 144 to the nozzle outlet 146.

In various embodiments, the nozzle 140 includes a nozzle wall 150 defining the nozzle flowpath 148, such as shown in FIG. 4. In one embodiment, the nozzle wall 150 extends circumferentially around each nozzle centerline 117. As discussed further below in regard to FIGS. 9-10, in embodiments such as generally provided in FIGS. 2-3, each nozzle 140 and its corresponding nozzle centerline 117 is disposed in adjacent circumferential arrangement around the combustor centerline 115 of each combustor 112. As such, the nozzle wall 150 may define an annular wall around each nozzle centerline 117. However, in other embodiments, such as generally provided in FIGS. 5-6, each nozzle 140 is defined around the longitudinal centerline 116 of the propulsion system 102. As such, the nozzle wall 150 may define an annular wall around the longitudinal centerline 116.

In still various embodiments, the nozzle wall 150 is a continuous nozzle wall extending from the nozzle inlet 144 to the nozzle outlet 146. However, in other embodiments, the nozzle wall 150 may have any other suitable configuration. In various embodiments, the nozzle 140 defines a converging-diverging nozzle, in which the nozzle wall 150 decreases the nozzle flowpath area from approximately the nozzle inlet 144 to approximately a throat 152 between the nozzle inlet 144 and nozzle outlet 146, and in which the nozzle wall 150 increases the nozzle flowpath area from approximately the throat 152 to approximately the nozzle outlet 146.

Referring still to FIG. 7, the nozzle inlet 144 is configured to receive a flow of oxidizer during operation of the RDC system 100 and provide such flow oxidizer through/along the nozzle flowpath 148. The flow of oxidizer may be a flow of air, oxygen, etc. More specifically, when the nozzle 140 of the nozzle assembly 128 is incorporated into the RDC system 100 of the propulsion system 102 of FIG. 1, the flow of oxidizer will be a flow of compressed air from the inlet section 104.

The nozzle 140, or more specifically the nozzle wall 150, further defines the throat 152 between the nozzle inlet 144 and the nozzle outlet 146, i.e., downstream of the nozzle inlet 144 and upstream of the nozzle outlet 146. As used herein, the term "throat", with respect to the nozzle 140, refers to the point within the nozzle flowpath 148 having the smallest cross-sectional area. Additionally, as used herein, the term "cross-sectional area", such as a cross-sectional area of the throat 152, refers to an area within the nozzle flowpath 148 at a cross-section measured along the radial direction RR at the respective location along the nozzle flowpath 148.

In various embodiments, the nozzle 140 may be referred to as a converging-diverging nozzle. Further, for the embodiment depicted, the throat 152 is positioned closer to the nozzle inlet 144 than the nozzle outlet 146 along the lengthwise direction 142 of the nozzle 140. More specifically, as is depicted, the nozzle 140 defines a length 160 along the lengthwise direction 142. The throat 152 for the exemplary nozzle 140 depicted is positioned in a forward, or upstream, portion of the length 160 of the nozzle 140. More specifically, still, for the embodiment depicted the throat 152 of the exemplary nozzle 140 depicted is positioned approximately between the forward ten percent and fifty percent of the length 160 of the nozzle 140 along the lengthwise direction 142, such as approximately between the forward twenty percent and forty percent of the length 160 of the nozzle 140 along the lengthwise direction 142.

A nozzle 140 having such a configuration may provide for a substantially subsonic flow through the nozzle flowpath 148. For example, the flow from the nozzle inlet 144 to the throat 152 (i.e., a converging section 159 of the nozzle 140) may define an airflow speed below Mach 1. The flow through the throat 152 may define an airflow speed less than Mach 1, but approaching Mach 1, such as within about ten percent of Mach 1, such as within about five percent of Mach 1.

Additionally, the flow from the throat 152 to the nozzle outlet 146 (i.e., a diverging section 161 of the nozzle 140) may again define an airflow speed below Mach 1 and less than the airflow speed through the throat 152. In other embodiments, the airflow speed may be Mach 1 downstream of the throat 152. For example, a small region downstream of the throat 152 may define an airflow speed at or above Mach 1 before defining a weak normal shock to less than Mach 1.

Referring still to FIG. 7, the RDC system 100 further includes a fuel injection port 162. The fuel injection port 162 defines a fuel outlet 164 in fluid communication with the nozzle flowpath 148 and located between the nozzle inlet 144 and the nozzle outlet 146 for providing fuel to the flow of oxidizer received through the nozzle inlet 144. More specifically, in various embodiments, the fuel outlet 164 of the fuel injection port 162 is positioned within a buffer distance from the throat 152 of the nozzle 140 along the lengthwise direction 142 of the nozzle 140 (with the buffer distance being a distance equal to ten percent of the length 160 of the nozzle 140 along the lengthwise direction 142). More particularly, for the embodiment depicted, the fuel outlet 164 of the fuel injection port 162 is positioned at the throat 152 of the nozzle 140, or downstream of the throat 152 of the nozzle 140 along the lengthwise direction 142 of the nozzle 140. More specifically still, for the embodiment depicted, the fuel outlet 164 of the fuel injection port 162 is positioned at the throat 152 of the nozzle 140. It will be appreciated, that as used herein, the term "at the throat of the nozzle" refers to including at least a portion of the component or feature positioned at a location within the nozzle flowpath 148 defining the smallest cross-sectional area (i.e., defining the throat 152). Notably, for the embodiment of FIG. 5, the throat 152 of the exemplary nozzle 140 depicted is not a single point along the lengthwise direction 142, and instead extends for a distance along the lengthwise direction 142. For the purposes of measuring locations of features or parts relative to the throat 152, the measurement may be taken from anywhere within the nozzle flowpath 148 defining the throat 152. Notably, although the fuel injection port 162 is depicted as including two outlets 164 in radially adjacent arrangement, it should be understood that a plurality of fuel injection ports 162 may be distributed along the circumferential direction (relative to the nozzle centerline 117) along the annulus of the nozzle 140.

The fuel provided through the fuel injection port 162 may be any suitable fuel, such as a hydrocarbon-based fuel, for mixing with the flow of oxidizer. More specifically, for the embodiment depicted the fuel injection port 162 is a liquid fuel injection port configured to provide a liquid fuel to the nozzle flowpath 148, such as a liquid jet fuel. However, in other exemplary embodiments, the fuel may be a gaseous fuel, or a mixture of a liquid fuel and gaseous fuel, or a mixture of a liquid fuel and a non-fuel gas, or any other suitable fuel, or combinations thereof.

Accordingly, for the embodiment depicted, positioning the fuel outlet 164 of the fuel injection port 162 in accordance with the description above may allow for the liquid fuel provided through the outlet 164 of the fuel injection port 162 to substantially completely atomize within the flow of oxidizer provided through the nozzle inlet 144 of the nozzle 140. Such may provide for a more complete mixing of the fuel within the flow of oxidizer, providing for a more complete and stable combustion within the combustion chamber 122.

Furthermore, for the embodiment depicted, the fuel injection port 162 is integrated into the nozzle 140. More specifically, for the embodiment depicted, the fuel injection port 162 extends through, and may be at least partially defined by, or positioned within, an opening extending through the nozzle wall 150 of the nozzle 140. Additionally, for the embodiment, the fuel injection port 162 further includes a plurality of fuel injection ports 162, with each fuel injection port 162 defining an outlet 164. In various embodiments, the plurality of fuel injection ports 162, each defining the outlet 164, are arranged along the circumferential direction around the longitudinal centerline 116. The plurality of fuel injection ports 162 may be arranged in symmetric or asymmetric arrangement around the longitudinal centerline 116.

Each of the one or more fuel injection ports 162 may be fluidly connected to a fuel source, such as a fuel tank, through one or more fuel lines for supplying the fuel to the fuel injection ports 162 (not shown). Additionally, it should be appreciated, that in other exemplary embodiments, the fuel injection port 162 may not be integrated into the nozzle 140. With such an exemplary embodiment, the RDC system 100 may instead include a fuel injection port having a separate structure extending, e.g., through the nozzle inlet 144 and nozzle flowpath 148. Such a fuel injection port may further define a fuel outlet positioned in the nozzle flowpath 148 between the nozzle inlet 144 and the nozzle outlet 146 for providing fuel to the flow of oxidizer received through the nozzle inlet 144.

A nozzle 140 in accordance with one or more of the exemplary embodiments described herein may allow for a relatively low pressure drop from the nozzle inlet 144 to the nozzle outlet 146 and into the combustion chamber 122. For example, in certain exemplary embodiments, a nozzle 140 in accordance with one or more of the exemplary embodiments described herein may provide for a pressure drop of less than about twenty percent. For example, in certain exemplary embodiments the nozzle 140 may provide for a pressure drop less than about twenty-five percent, such as between about one percent and about fifteen percent, such as between about one percent and about ten percent, such as between about one percent and about eight percent, such as between about one percent and about six percent. It should be appreciated, that as used herein, the term "pressure drop" refers to a pressure difference between a flow at the nozzle outlet 146 and at the nozzle inlet 144, as a percentage of the pressure of the flow at the nozzle inlet 144. Notably, including a nozzle 140 having such a relatively low pressure drop may generally provide for a more efficient RDC system 100. In addition, inclusion of a nozzle 140 having a converging-diverging configuration as is depicted and/or described herein may prevent or greatly reduce a possibility of the high pressure fluid (e.g., combustion products) within the region 134 behind the detonation wave 130 from flowing in an upstream direction, i.e., into the incoming fuel/air mixture flow 132 (see FIG. 6).

In various embodiments, each nozzle 140 in the plurality of nozzles 140 may be configured in accordance with one or more of the embodiments described above with reference to FIG. 7. Further, in certain embodiments, each nozzle 140 in the plurality of nozzles 140 may be configured in substantially the same manner, or alternatively, in other embodiments, one or more of the plurality of nozzles 140 may include a varied geometry. Furthermore, in still various embodiments, each nozzle 140 in the plurality of nozzles 140 may be configured in accordance with one or more of the embodiments described above with reference to FIG. 7. Further, in certain embodiments, each nozzle 140 in the plurality of nozzles 140 may be configured in substantially the same manner, or alternatively, in other embodiments, one or more of the plurality of nozzles 140 may include a varied geometry. For example, the nozzle wall 150 of each nozzle 140 may define varied converging-diverging geometries, such as varying angles relative to the longitudinal centerline 116. In still other embodiments, the fuel injection ports 162 of each nozzle 140 may define various areas, volumes, flowpaths, or other flow characteristics relative to each nozzle 140, or relative to various circumferential locations within each nozzle 140. In yet other embodiments, the nozzles 140 may be evenly spaced from one another between the outer wall 118 and the inner wall 120. In other embodiments, the nozzles 140 may be disposed in uneven arrangement such that one nozzle 140 defines a larger or smaller throat 152 than another nozzle 140. Still further, although each of the plurality of nozzles 140 is depicted as including a substantially circular nozzle inlet 144 (and a substantially circular nozzle flowpath 148 along the respective lengthwise directions 142), in other embodiments, one or more of the plurality of nozzles 140 instead define any other suitable cross-sectional shape along a respective lengthwise direction 142, such as an ovular shape, a polygonal shape, etc. Similarly, although the converging and diverging sections 159, 161 are depicted as conical, in other exemplary embodiments, one or both of the sections 159, 161 may be defined by curved walls, or any other suitable shape. Additionally, the throat 152 of the nozzle 140 may be a single point along the longitudinal direction L, as opposed to an elongated cylindrical section.

Figure 8:
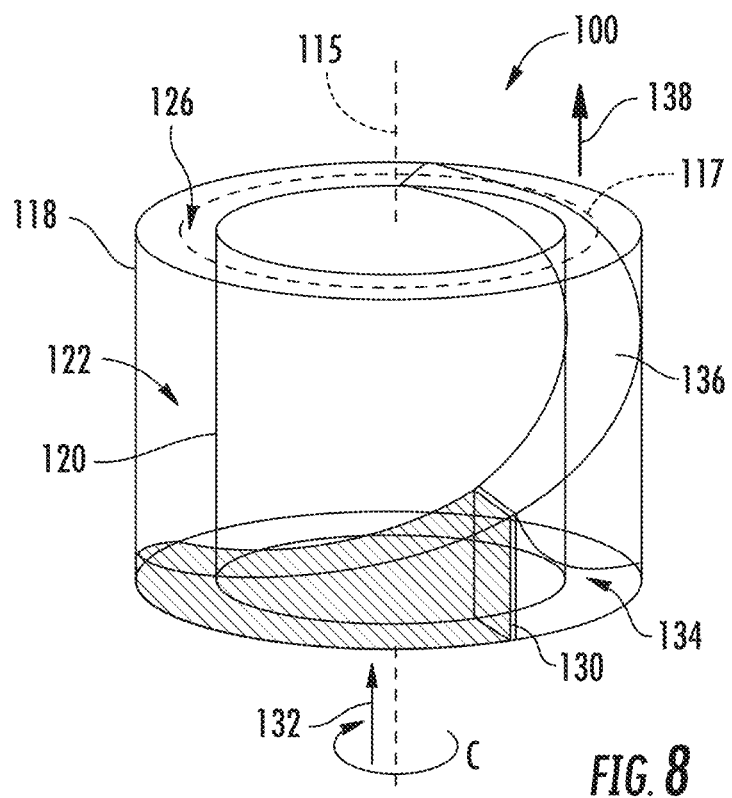
FIG. 8 is a perspective view of a single combustion chamber of the exemplary rotating detonation combustion system of FIGS. 1-3.

Referring briefly to FIG. 8, providing a perspective view of the combustion chamber 122 (without the nozzle assembly 128 shown), it will be appreciated that the RDC system 100 generates the detonation wave 130 during operation. The detonation wave 130 travels in the circumferential direction C relative to the combustor centerline 115 consuming an incoming fuel/oxidizer mixture 132 and providing a high pressure region 134 within an expansion region 136 of the combustion. A burned fuel/oxidizer mixture 138 (i.e., combustion products) exits the combustion chamber 122 and is exhausted.

More particularly, it will be appreciated that the RDC system 100 is of a detonation-type combustor, deriving energy from the continuous wave 130 of detonation. For a detonation combustor, such as the RDC system 100 disclosed herein, the combustion of the fuel/oxidizer mixture 132 is effectively a detonation as compared to a burning, as is typical in the traditional deflagration-type combustors. Accordingly, a main difference between deflagration and detonation is linked to the mechanism of flame propagation. In deflagration, the flame propagation is a function of the heat transfer from a reactive zone to the fresh mixture, generally through conduction. By contrast, with a detonation combustor, the detonation is a shock induced flame, which results in the coupling of a reaction zone and a shockwave. The shockwave compresses and heats the fresh mixture 132, increasing such mixture 132 above a self-ignition point. On the other side, energy released by the combustion contributes to the propagation of the detonation shockwave 130. Further, with continuous detonation, the detonation wave 130 propagates around the combustion chamber 122 in a continuous manner, operating at a relatively high frequency. Additionally, the detonation wave 130 may be such that an average pressure inside the combustion chamber 122 is higher than an average pressure within typical combustion systems (i.e., deflagration combustion systems).

Accordingly, the region 134 behind the detonation wave 130 has very high pressures. As will be appreciated from the discussion below, the nozzle assembly 128 of the RDC system 100 is designed to prevent the high pressures within the region 134 behind the detonation wave 130 from flowing in an upstream direction, i.e., into the incoming flow of the fuel/oxidizer mixture 132.

Figure 10:
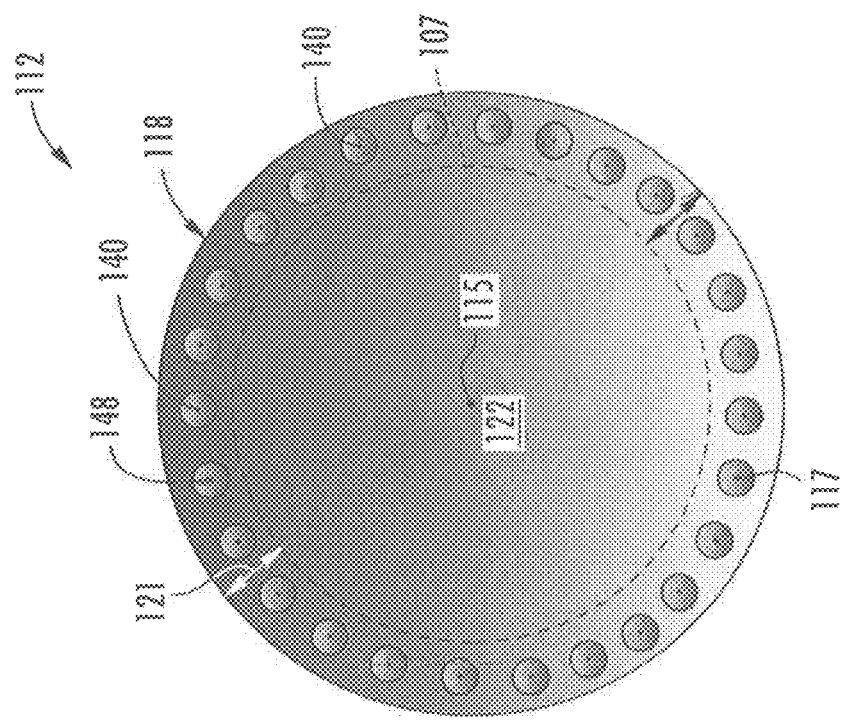
FIG. 10 is a cross-sectional circumferential view of another exemplary embodiment of a single combustor of the rotating detonation combustion system of FIGS. 1-6.
Figure 9:
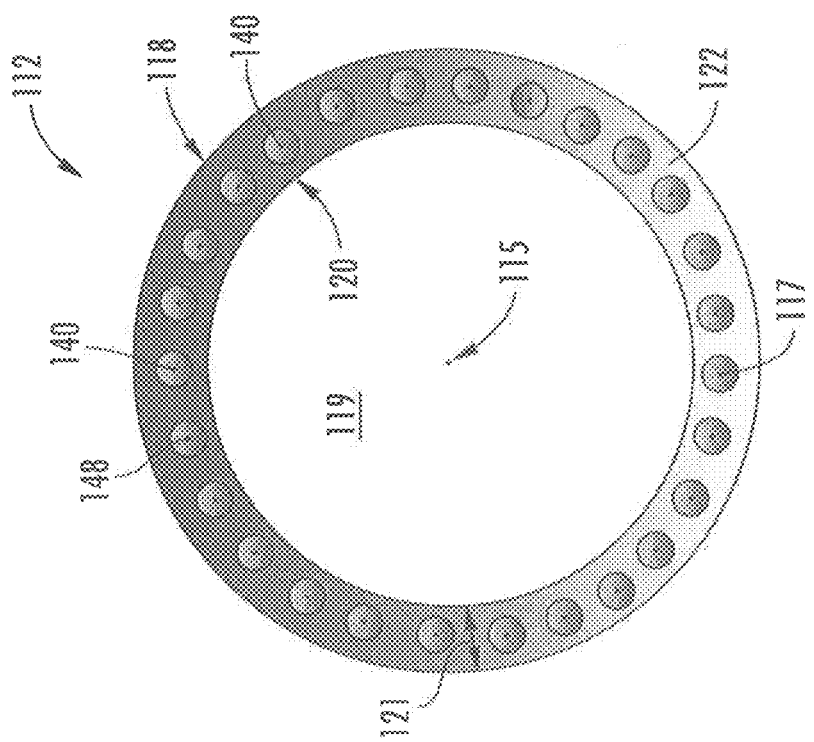
FIG. 9 is a cross-sectional circumferential view of an exemplary embodiment of a single combustor of the rotating detonation combustion system of FIGS. 1-6.

Referring now to FIGS. 9-10, exemplary embodiments of the combustors 112 are generally provided from a downstream end viewed toward upstream. Each embodiment includes a plurality of nozzles 140 each disposed around each nozzle centerline 117. Furthermore, each nozzle centerline 117 is disposed in circumferential arrangement around each combustor centerline 115. In the embodiment provided in FIG. 7, the combustor 117 defines a centerbody 119 that further defines an inner wall 120 to each combustion chamber 122. In other words, in the embodiment provided in FIG. 9, each combustion chamber 122 is defined by the outer wall 118 and the inner wall 120. The annular gap 121 extends between the inner wall 120 and the outer wall 118, together at least partially defining the volume of the combustion chamber 122. In other words, the annular gap 121 is defined by the area between the outer wall 118 and the inner wall 120.

Referring now to FIGS. 11-14, cross sectional views of at least a portion of several exemplary embodiments the RDC system 100 are generally provided. The embodiments generally provided include the plurality of combustors 112 arranged in radial arrangement from the longitudinal centerline 116 of the propulsion system 102 such as generally provided in FIG. 3. However, it should be appreciated that, in other embodiments, each of the embodiments generally provided in FIGS. 9-12 may be arranged in circumferential arrangement around the longitudinal centerline 116.

As generally provided in FIGS. 9-12, the RDC system 100 may further define a rotating detonation combustor inlet 200 ("RDC inlet 200") upstream of the plurality of nozzles 140 of each combustor 112 and a rotating detonation combustor outlet 250 ("RDC outlet 250") downstream of the combustion chamber 122 of each combustor 112. The RDC inlet 200 is configured to direct the flow of oxidizer 131 from the inlet section 104 into each of the arrays of combustors 112 (e.g., the first array 166, the second array 168, the third array 170 . . . the Nth array). Furthermore, the RDC outlet 250 is configured to direct the flow of combustion products 138 from the combustion chamber 122 of each combustor 112 to the exhaust section 106.

Referring to FIGS. 12-14, the RDC inlet 200 may further include an articulating inlet wall 210 configured to direct the flow of oxidizer 131 to one array of combustors 112 and at least substantially block the flow of oxidizer 131 from entering the other arrays of combustors 112. The inlet wall 210 may define a plurality of vanes, walls, doors, or valves. The inlet wall 210 may hinge about an axis such as to define a flowpath toward one array of combustors 112. In one embodiment, such as generally provided in FIGS. 12-14, the inlet wall 210 hinges or rotates about an axis defined at a forward or upstream of the inlet wall 210. However, in various embodiments, the inlet wall 210 may rotate about an axis defined mid-span or at an aft or downstream end of the inlet wall 210.

Referring still to FIGS. 12-14, the RDC inlet 200 may further include an articulating outlet wall 220 configured to direct the flow of combustion gases 138 from one array of combustors 112 toward the exhaust section 106. Furthermore, the outlet wall 220 may prevent a backflow to other arrays of combustors 112. The outlet wall 220 may define a plurality of vanes, walls, doors, or valves. The outlet wall 220 may hinge about an axis such as to define a flowpath toward one array of combustors 112. In one embodiment, such as generally provided in FIGS. 10-12, the outlet wall 220 hinges or rotates about an axis defined at a forward or upstream of the outlet wall 220. However, in various embodiments, the outlet wall 220 may rotate about an axis defined mid-span or at an aft or downstream end of the outlet wall 220. In various embodiments, the articulating outer wall 220 directs the flow of combustion gases 138 from a single array of combustors 112 to the exhaust section 106 based at least on an operating condition of the RDC system 100 and propulsion system 102, such as further described below.

The plurality of inlet walls 210 may be coupled to a common rail or bracket system coupled to an actuator such that the plurality of inlet walls 210 disposed circumferentially around the longitudinal centerline 116 may articulate or rotate in unison. The plurality of outlet walls 220 may be coupled to a common rail or bracket system coupled to an actuator such that the plurality of outlet walls 220 disposed circumferentially around the longitudinal centerline 116 may articulate or rotate in unison. In still another embodiment, the plurality of inlet walls 210 and outlet walls 220 may together be configured to articulate or rotate in unison based at least on an operating condition of the propulsion system 102.

Referring now to FIGS. 1-14, during operation of the propulsion system 102, a flow of oxidizer 131 enters through an inlet 108 of the propulsion system 102 into the inlet section 104. The inlet section 104 may generally compress the flow of oxidizer 131 before the oxidizer enters the RDC system 100. The RDC inlet 210, as generally provided in FIGS. 10-12, guides or directs the flow of oxidizer to the arrays of combustors 112 and, more specifically, the nozzle assembly 128 of each combustor 112. A flow of fuel 163 (shown in FIG. 5) enters the nozzle flowpath 148 of each nozzle 140 through the fuel outlet 162. The flow of oxidizer 131 and the fuel 163 together mix (shown schematically by the fuel-oxidizer mixture 132 shown in FIGS. 7-8) and are detonated in the combustion chamber 122 of each combustor 112. The combustion products 138 from the detonation flow downstream to the exhaust section 106 of the propulsion system 102. The combustion products 138 generate a propulsive force through the exhaust section 106 defining a nozzle structure, a turbine structure, or both.

More specifically, during an operation of the propulsion system 102, a flow of fuel 163 is delivered sequentially to one or more arrays of combustors 112 based at least on an operating condition of the propulsion system 102. For example, during light off and a lowest steady state operating condition (e.g., ground idle), a flow of fuel 163 is delivered to the first array 166 of combustors 112 to be mixed with the flow of oxidizer 131 and detonated to yield combustion gases 138. The flow of fuel 163 may be restricted from delivery to the second array 168 and the third array 170 by way of independently adjustable fuel manifolds, fuel lines, or valves (not shown).

During a transition from a lowest steady state operating condition to an intermediate or highest steady state operating condition, the flow of fuel 163 may be delivered to one or more of the first array 166, the second array 168, and the third array 170 of combustors 112 to be mixed with the flow of oxidizer 131 and detonated to yield combustion gases 138. At a highest steady state operating condition (e.g., maximum takeoff) or an intermediate steady state operating condition (e.g., between ground idle and maximum takeoff, or cruise condition, etc.), the flow of fuel 163 may be delivered exclusively to the third array 170 or the second array 168, each configured to a respective operating condition.

Still further, in various embodiments, during an operation of the propulsion system 102, the inlet walls 210 and the outlet walls 220 each articulate or rotate based on the operating condition. For example, as shown in FIG. 13, the inlet walls 210 and the outlet walls 220 may articulate to direct the flow of oxidizer 131 to the first array 166 of combustors 112 (e.g., defining a first volume 201 optimized for a lowest pressure and temperature at the combustion chamber 122) during a lowest steady state operating condition of the propulsion system 102. The outlet walls 220 articulate to substantially block the second array 168 and the third array 170 to prevent combustion gases 138 from the first array 166 from backflowing into the second array 168 and third array 170 of combustors 112. The outer walls 220 may further substantially block a flow of oxidizer 195 through the second array 168 and the third array 170 from flowing downstream to the exhaust section 106 while enabling a flow of combustion gases 138 from the first array 166.

As another example, as shown in FIG. 14, the inlet walls 210 and the outlet walls 220 may articulate to direct the flow of oxidizer 131 to the third array 170 of combustors 112 (e.g., defining a third volume 203 optimized for a highest pressure and temperature at the combustion chamber 122) during a highest steady state operating condition of the propulsion system 102. The outlet walls 220 articulate to substantially block the first array 166 and the second array 168 to prevent combustion gases 138 from the third array 170 from backflowing into the first array 166 and second array 168 of combustors 112. The outer walls 220 may further substantially block a flow of oxidizer 195 through the first array 166 and the second array 168 from flowing downstream to the exhaust section 106 while enabling a flow of combustion gases 138 from the third array 170.

As yet another example, as shown in FIG. 12, the inlet walls 210 and the outlet walls 220 may articulate to direct the flow of oxidizer 131 to the second array 168 of combustors 112 (e.g., defining a second volume 202 optimized for an intermediate pressure and temperature at the combustion chamber 122) during an intermediate steady state or transient operating condition of the propulsion system 102. The outlet walls 220 articulate to substantially block the first array 166 and the third array 170 to prevent combustion gases 138 from the second array 168 from backflowing into the first array 166 and third array 170 of combustors 112. The outer walls 220 may further substantially block a flow of oxidizer 195 through the first array 166 and the third array 170 from flowing downstream to the exhaust section 106 while enabling a flow of combustion gases 138 from the second array 168.

Although each array is described and shown in a certain order relative to other arrays from the longitudinal centerline 116, it should be appreciated that the arrays 166, 168, 170 may be arranged in other orders relative to the volumes of the combustion chamber 122 defined. Still further, although certain operating conditions are described in the context of aircraft landing/takeoff cycles, it should be appreciated that the operating conditions may include cycles specific to land- or marine-based power generation gas turbine engines, auxiliary power units, turboprop or turboshaft apparatuses, rockets, missiles, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotating detonation combustion (RDC) system for a propulsion system, the rotating detonation combustion system defining a radial direction, a circumferential direction, and a longitudinal centerline, the rotating detonation combustion system comprising:
a plurality of combustors in adjacent arrangement along the circumferential direction, wherein each combustor defines a combustor centerline extended through each combustor, and wherein each combustor comprises an outer wall defining a combustion chamber and a combustion inlet, wherein each combustion chamber is defined by an annular gap and a combustion chamber length together defining a volume of each combustion chamber, and further wherein each combustor defines a plurality of nozzle assemblies each disposed at the combustion inlet in adjacent arrangement around each combustor centerline, and wherein a first array of combustors of the plurality of combustors includes combustors having combustion chambers defining a first volume and a second array of combustors of the plurality of combustors includes combustors having combustion chambers defining a second volume different from the first volume, wherein the combustors of the first array of combustors are in adjacent circumferential arrangement with one another a first radial distance from the longitudinal centerline, and the combustors of the second array of combustors are in adjacent circumferential arrangement with one another a second radial distance from the longitudinal centerline different from the first radial distance, and respective combustors in the first array of combustors are radially aligned in the radial direction with respective combustors in the second array of combustors,
wherein, in a lowest steady-state operating condition of the rotating detonation combustion system, fuel is delivered to each combustor in the first array of combustors and fuel is restricted from being delivered to the combustors in the second array of combustors such that each combustor in the first array of combustors is operated at the lowest steady-state operating condition and each combustor in the second array of combustors is not operated at the lowest steady-state operating condition, and at a highest steady-state operating condition of the rotating detonation combustion system, fuel is delivered to each combustor in the second array of combustors such that each combustor in the second array of combustors is operated at the highest steady-state operating condition, and
wherein the RDC system further defines a third array of combustors, each combustor of the third array of combustors being aligned along the radial direction with the respective combustors of the first array of combustors and the respective combustors of the second array of combustors, and wherein the combustors of the third array of combustors each define a third volume different from the first volume and from the second volume, wherein the third array of combustors is configured to produce a detonation cell width specific to an intermediate steady-state or transient operating condition of the RDC system, and wherein, in the lowest steady-state operating condition of the RDC system, fuel is restricted from being delivered to the combustors in the third array of combustors, and in the intermediate steady-state or a transient operating condition of the RDC system, fuel is delivered to each combustor in the third array of combustors such that each combustor in the third array of combustors is operating at the intermediate steady-state or transient operating condition.

2. The rotating detonation combustion system of claim 1, wherein each of the combustors of the third array of combustors are defined in circumferential arrangement at a third radial distance from the longitudinal centerline different from the first radial distance and different from the second radial distance.

3. The rotating detonation combustion system of claim 1, wherein the combustors of the first array of combustors defines the first volume configured to produce a detonation cell width specific to the lowest steady-state operating condition.

4. The rotating detonation combustion system of claim 1, wherein the combustors of the second array of combustors defines the second volume configured to produce a detonation cell width specific to the highest steady-state operating condition.

5. The rotating detonation combustion system of claim 1, further comprising a rotating detonation combustor inlet configured to direct a flow of an oxidizer to one or more of the first array of combustors and the second array of combustors.

6. The rotating detonation combustion system of claim 5, wherein the rotating detonation combustor inlet comprises one or more articulating inlet walls configured to direct the flow of the oxidizer to one of the first array of combustors and the second array of combustors.

7. The rotating detonation combustion system of claim 1, further comprising a rotating detonation combustor outlet configured to direct a flow of combustion gases from one of the first array of combustors and the second array of combustors to an exhaust section.

8. The rotating detonation combustion system of claim 7, wherein the rotating detonation combustor outlet comprises one or more articulating outlet walls configured to direct the flow of combustion gases from one of the first array of combustors and the second array of combustors to the exhaust section.

9. The rotating detonation combustion system of claim 1, wherein each of the plurality of combustors comprises:
a centerbody defining an inner wall of each combustion chamber,
wherein, each of the plurality of nozzle assemblies include a nozzle inlet, a nozzle outlet, and a fuel injection port defining a fuel outlet located between the nozzle inlet and the nozzle outlet for providing fuel to a flow of oxidizer received through the nozzle inlet.

10. The rotating detonation combustion system of claim 1, wherein the rotating detonation combustion system is configured to provide the fuel sequentially to the combustors of the first array of combustors and to the combustors of the second array of combustors.

11. A propulsion system defining a radial direction, a longitudinal direction, and a circumferential direction, wherein a longitudinal centerline extends along the longitudinal direction, and wherein the propulsion system defines an upstream end and a downstream end, the propulsion system comprising:
an inlet section at the upstream end into which an oxidizer flows;

a rotating detonation combustion (RDC) system downstream of the inlet section comprising a plurality of combustors in adjacent arrangement along the circumferential direction, wherein each combustor defines a combustor centerline extended through each combustor, and wherein each combustor comprises an outer wall defining a combustion chamber and a combustion inlet, wherein each combustion chamber is defined by an annular gap and a combustion chamber length together defining a volume of each combustion chamber, and further wherein each combustor defines a plurality of nozzle assemblies each disposed at the combustion inlet in adjacent arrangement around each combustor centerline, wherein each nozzle assembly defines a converging-diverging nozzle, and wherein a first array of the plurality of the combustors includes combustors having combustion chambers defining a first volume and a second array of the plurality of combustors includes combustors having combustion chambers defining a second volume different from the first volume, wherein the combustors of the first array of the combustors are in adjacent circumferential arrangement with one another a first radial distance from the longitudinal centerline, and the combustors of the second array of the combustors are in adjacent circumferential arrangement with one another a second radial distance from the longitudinal centerline different from the first radial distance, and respective combustors of the first array of the combustors are radially aligned in the radial direction with respective combustors in the second array of the combustors; and an exhaust section downstream of the RDC system, wherein, in a lowest steady-state operating condition of the RDC system, fuel is delivered to each combustor in the first array of combustors and fuel is restricted from being delivered to the combustors in the second array of combustors such that each combustor in the first array of combustors is operated at the lowest steady-state operating condition and each combustor in the second array of combustors is not operated at the lowest steady-state operating condition, and at a highest steady-state operating condition of the rotating detonation combustion system, fuel is delivered to each combustor in the second array of combustors such that each combustor in the second array of combustors is operated at the highest steady-state operating condition, and wherein the RDC system further defines a third array of combustors, each combustor of the third array of combustors being aligned along the radial direction with the respective combustors of the first array of combustors and the respective combustors of the second array of combustors, and wherein the combustors of the third array of combustors each define a third volume different from the first volume and from the second volume, wherein the third array of combustors is configured to produce a detonation cell width specific to an intermediate steady-state or transient operating condition of the RDC system, and wherein, in the lowest steady-state operating condition of the RDC system, fuel is restricted from being delivered to the combustors in the third array of combustors, and in the intermediate steady-state or a transient operating condition of the RDC system, fuel is delivered to each combustor in the third array of combustors such that each combustor in the third array of combustors is operating at the intermediate steady-state or transient operating condition.

12. The propulsion system of claim 11, wherein the combustors of the first array of combustors defines the first volume configured to produce a detonation cell width specific to the lowest steady-state operating condition.

13. The propulsion system of claim 11, wherein the combustors of the second array of combustors defines the second volume configured to produce a detonation cell width specific to the highest steady-state operating condition.

14. The propulsion system of claim 11, wherein the RDC system comprises a rotating detonation combustor inlet configured to direct a flow of an oxidizer from the inlet section to one or more of the first array of combustors and the second array of combustors.

15. The propulsion system of claim 11, wherein the RDC system comprises a rotating detonation combustor outlet configured to direct a flow of combustion gases from one of the first array of combustors and the second array of combustors to the exhaust section.

* * * * *